United States Patent [19]

Buchner et al.

[11] Patent Number: 5,427,839
[45] Date of Patent: Jun. 27, 1995

[54] OVERPRESSURE VALVE FOR PACKAGING CONTAINERS

[75] Inventors: Norbert Buchner, Winnenden; Klaus Domke, Ditzingen; Manfred Reichert, Remshalden; Herbert Stotkiewitz, Bietigheim-Bissingen; Bernd Wilke, Leutenbach; Sabine Zimmermann, Kornwestheim; Kuno Lemke, Bietigheim-Bissingen; Guenther Voegele, Schoenaich, all of Germany

[73] Assignee: Robert Bosch GmbH, Stuttgart, Germany

[21] Appl. No.: 130,493

[22] Filed: Oct. 1, 1993

[30] Foreign Application Priority Data

Dec. 18, 1992 [DE] Germany ............ 42 43 020.8

[51] Int. Cl.⁶ .................................. B32B 9/00
[52] U.S. Cl. ................................ 428/192; 428/193; 428/194; 428/195; 428/201; 428/202; 428/214; 383/103; 137/246
[58] Field of Search ........... 428/192, 195, 193, 194, 428/201, 202, 214

[56] References Cited

U.S. PATENT DOCUMENTS

| | | | |
|---|---|---|---|
| 2,927,722 | 11/1954 | Metzger | 229/62.5 |
| 2,946,502 | 7/1960 | Metzger | 229/62.5 |
| 4,134,535 | 1/1979 | Barthols et al. | 229/62.5 |
| 4,553,693 | 11/1985 | Terajima et al. | 229/7 |
| 4,653,661 | 3/1987 | Buchner et al. | 220/209 |
| 4,715,494 | 12/1987 | Heitzenrödner et al. | 206/213.1 |
| 4,971,218 | 11/1990 | Buchner et al. | 220/271 |
| 5,178,023 | 1/1993 | Domke et al. | 73/865.9 |
| 5,263,777 | 11/1993 | Domke | 383/103 |
| 5,326,176 | 7/1994 | Domke | 383/103 |

FOREIGN PATENT DOCUMENTS 0043425 5/1984 European Pat. Off. .
2931850 2/1981 Germany .

Primary Examiner—Patrick J. Ryan
Assistant Examiner—Abraham Bahta
Attorney, Agent, or Firm—Edwin E. Griegg; Ronald E. Greigg

[57] ABSTRACT

Overpressure valves for packaging containers are supplied in a roll, transported in this form to a packaging machine, separated here and attached to packaging containers by means of an adhesive coated surface. For this purpose the overpressure valves have a layer of emulsion bonding on their underside. To prevent individual layers of the roll from sticking together, the overpressure valves have an adhesive-repelling layer on their top side. The overpressure valves are connected to one another in one piece and in a row, and are separated consecutively in a packaging machine.

20 Claims, 3 Drawing Sheets

OVERPRESSURE VALVE FOR PACKAGING CONTAINERS

BACKGROUND OF THE INVENTION

The invention is based on an overpressure valve for packaging containers as defined hereinafter. An overpressure valve of this type and its method of production are known from German Patent Publication DE-A 29 31 850. The overpressure valves, which are circular in contour, are detachably glued on a backing strip. The disadvantage of this is the large amount of waste produced when the overpressure valves are punched out of the composite strip. Moreover, a backing strip that additionally increases production costs is necessary for handling or transporting the overpressure valves. Further, a device for attaching overpressure valves to packaging containers is known from European Patent Disclosure EP-A 0 043 425, with which the overpressure valves supplied on a supply roll and glued to the backing strip are detached individually from the backing strip and attached to the packaging container by their adhesive-coated underside. The disadvantage of this is that the backing strips must be collected separately and disposed of.

OBJECT AND SUMMARY OF THE INVENTION

In contrast, the overpressure valve of the invention, has the advantage that, because of the adhesive-repelling top surface of the spacing strips, the overpressure valves can be rolled up in the form of an endless row without the danger of their sticking together, and without the use of a special backing strip. The overpressure valves are supplied to the packaging containers in that they are separated individually from the roll in the packaging machine and transported. It is particularly advantageous when the contours of the overpressure valves are rectangular or hexagonal, so that they can be disposed directly next to one another in the composite strip, by means of which the quantity of waste created during separation of the overpressure valves from the composite strip is minimized, particularly with the rectangular embodiment.

Improvements of the overpressure valve disclosed are possible by means of the further developments outlined hereinafter.

The overpressure valve can be particularly easily produced, handled and stored.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
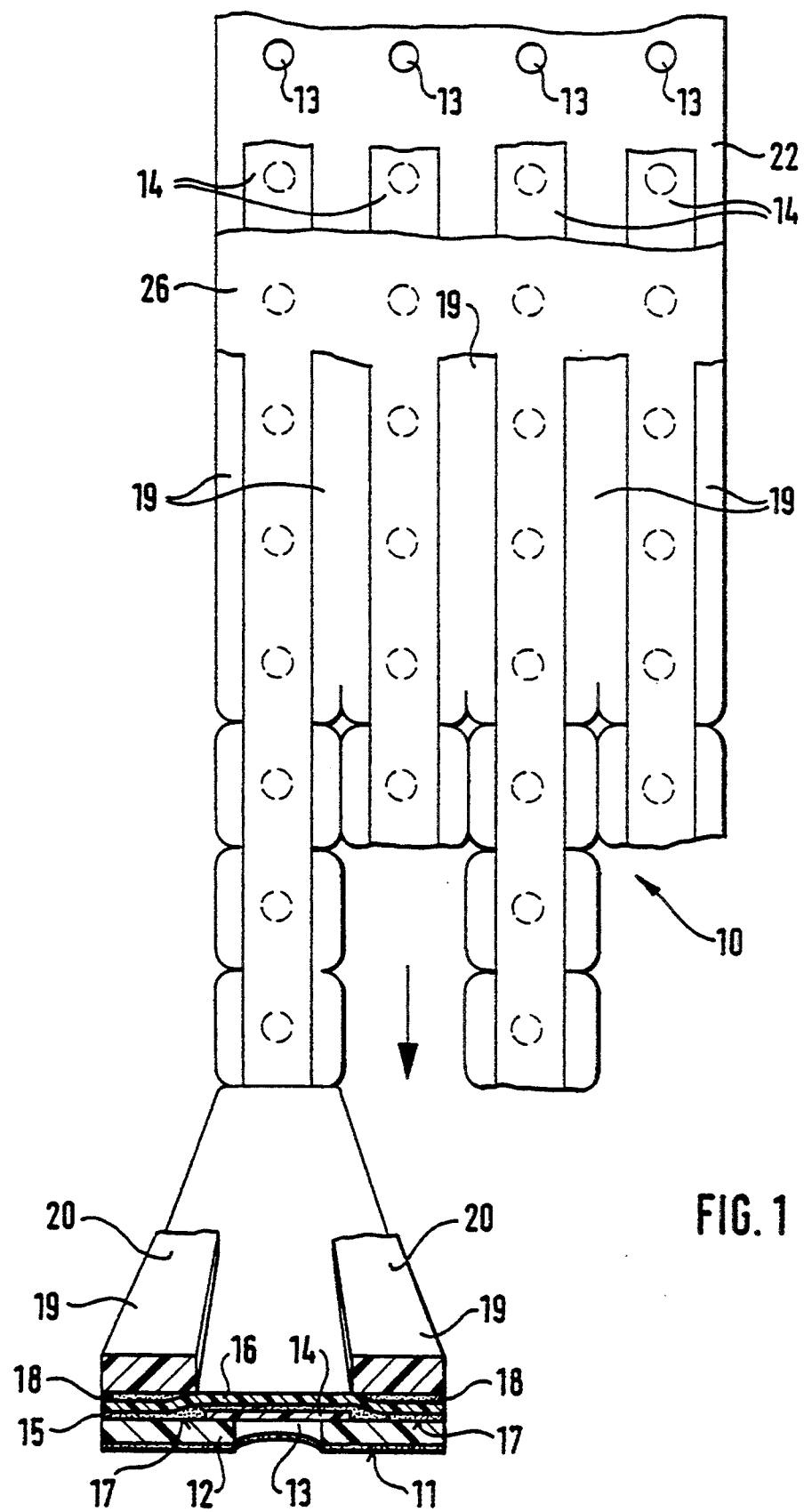
FIG. 1 schematically shows the manufacturing process of overpressure valves.

An overpressure valve 10 for packaging containers, such as for coffee, shown in FIG. 1, has a base 12 coated on the underside with adhesive 11 and a hole 13, through which the overpressure present in the packaging container can escape. The base 12 has in particular a thickness of 150 $\mu$m to 250 $\mu$m. A valve strip 14, which does not include an adhesive on either side and having a thickness of 5 $\mu$m to 35 $\mu$m, covers the hole 13 in the base 12 and is secured on a layer 15 of adhesive on the underside of a diaphragm 16, leaving two adhesive strips 17 free on the edge side. The diaphragm 16, which completely covers the base 12 and is secured to it by the two adhesive strips 17, has a thickness of 5 $\mu$m to 35 $\mu$m. The base 12, the valve strips 14 and the diaphragm 16 in this case comprise a material with one and the same temperature of expansion coefficients, particularly polyester. Moreover, the valve strips 14 and the diaphragm 16 can be coated with a barrier layer of silicon oxide, aluminum oxide or the like, for example. The valve strip 14 can be omitted when only two parallel adhesive strips 17 are applied to the edge side of the diaphragm 16 that leave free a strip-shaped central valve zone. Two spacing strips 19, which are provided on the underside with a layer 18 of adhesive and leave the valve strip 14 or the valve zone free, are fixed on the diaphragm 16 and coincide with the two adhesive strips 17 of the diaphragm 16. The spacing strips 19 consist of polyester, polyethylene, Teflon, silicon cardboard or polypropylene, for example, and have in particular a thickness of 150 $\mu$m to 500 $\mu$m. Their free top sides 20, whose surface can be grained, are made to be adhesive repelling by means of the application of a thin layer of silicon or Teflon. The adhesive used to construct the overpressure valves 10, 10a is a non-hardening bonding emulsion, preferably on a polyurethane base.

Figure 2:
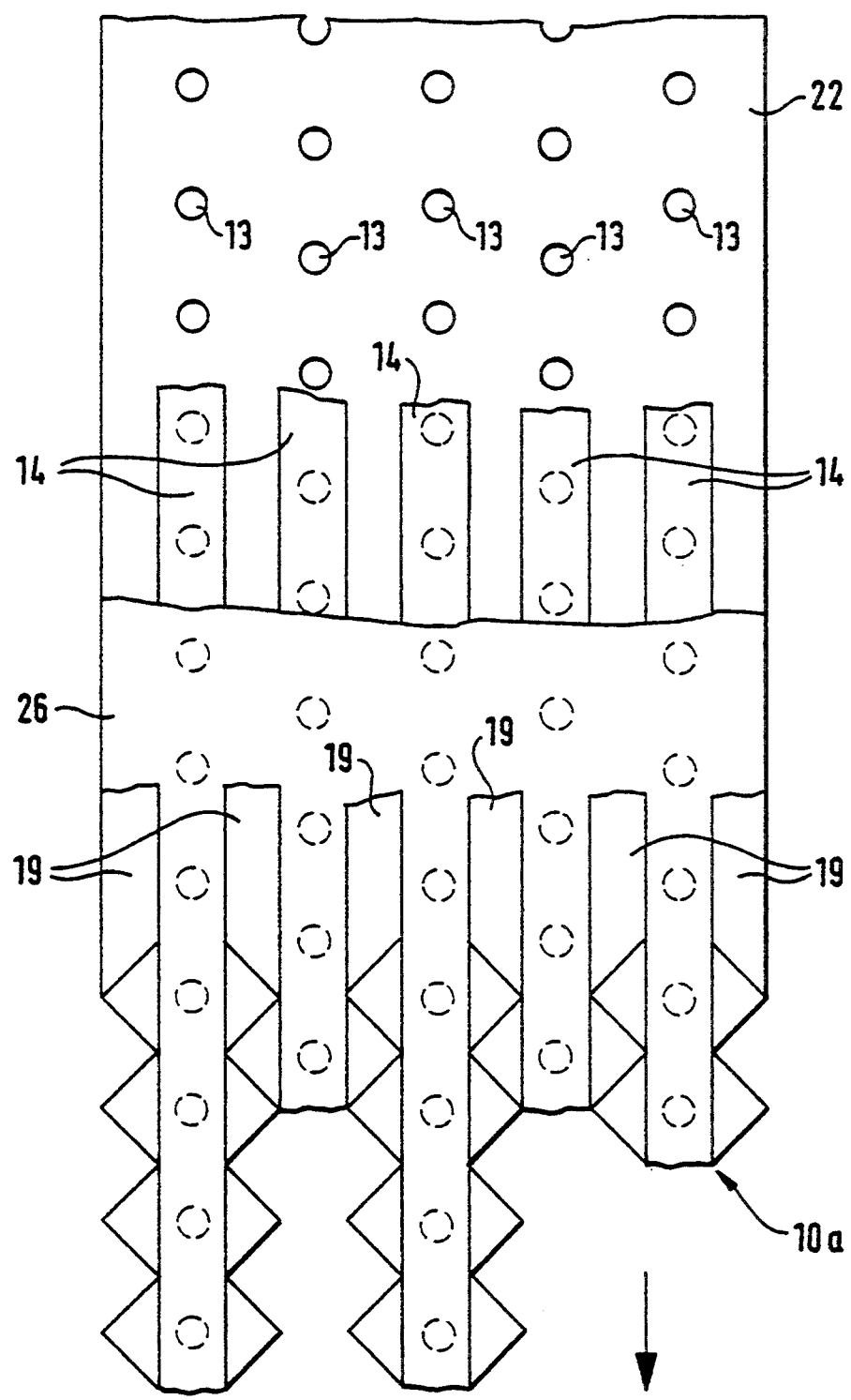
FIG. 2 shows the manufacturing process, in a modified form of overpressure valves, as compared to FIG. 1.
Figure 3:
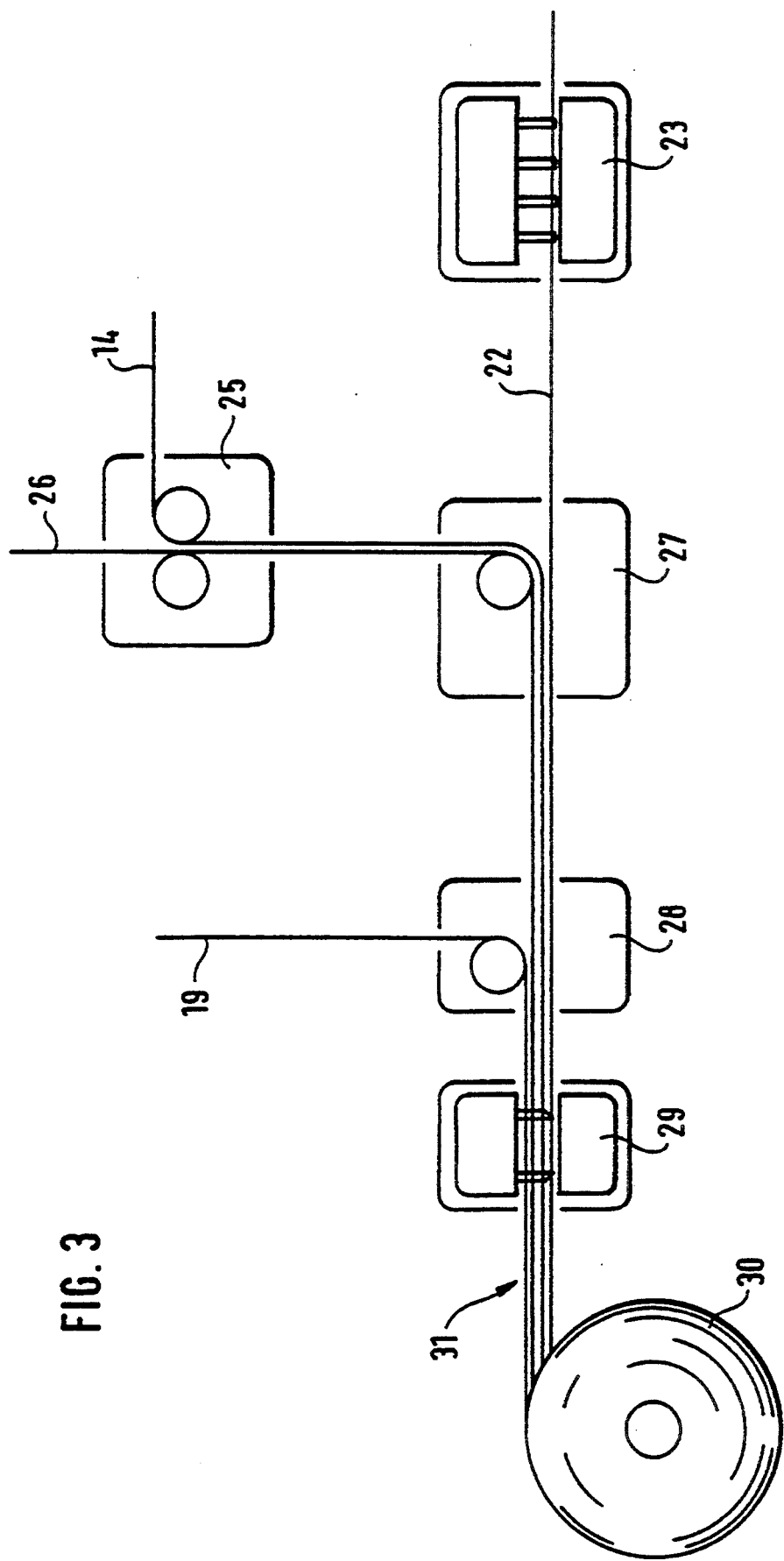
FIG. 3 shows an installation for manufacturing overpressure valves.

The above-described overpressure valves 10, 10a are produced in an installation shown in FIG. 3. In a station 23 in this installation, the holes 13 are continuously punched at uniform spacings into an incoming base strip 22 coated on the underside with adhesive. During this a valve strip 14, which is not adhesive on either side, and a diaphragm strip 26, which is provided on the underside with an adhesive layer 15, are connected to one another through rolling in a station 25, for example. The station 25 is omitted in an embodiment of the overpressure valves 10, 10a, which have no separate valve strips 14. In this case only the parallel adhesive strips 17 on the edges that leave free valve zones are disposed on the underside of the diaphragm strip 26. Subsequently, in a station 27 the diaphragm strip 26 is applied coincidingly with the valve strip 14 onto the base strip 22. Then the spacing strips 19, coated on the underside with adhesive and coinciding with the adhesive strips 17 of the diaphragm strip 26, are applied. In the exemplary embodiments shown, a composite strip 31 is produced by means of the above-described method to have a plurality of adjacent rows of overpressure valves 10, 10a, such as four or five rows. The composite web formed in this manner then passes through a station 29 in which overpressure valves 10, 10a connected to each other in one piece and in at least one row, are punched out of the composite web. This process results in an especially low material consumption when, as shown in FIG. 1, the contours of the overpressure valves 10 are rectangular. However, even when the overpressure valves 10a have a hexagonal contour, as in FIG. 2, a lower material consumption results in comparison to a round contour, for example, because waste only accumulates in the two edge regions of the composite web. In a final step, the rows of overpressure valves 10, 10a produced in this manner are wound to form a roll 30. In the process the base strip 22 rests with its underside coated with adhesive 11 on the adhesive-repelling top side of the spacing strips 19. The overpressure valves 10, 10a produced and stored in the form of rolls 30 are transported to a packaging container and further processed in it, in that they are separated individually from the roll 30 and attached to a packaging container via a degassing hole.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An overpressure valve (10, 10a) for a packaging container that has a base (12) coated on the underside with adhesive (11) and having a hole (13) through said base (12), a diaphragm (16) that covers an upper surface of said base (12) including the hole (13), said diaphragm includes at least two parallel adhesive strips (17) on a bottom surface facing said base (12) and secured to said upper surface of the base (12) alongside said hole (13) leaving a strip-shaped valve zone free of adhesive, and having two spacing strips (19) coated on their underside with a layer of adhesive (18) and secured to the upper surface of said diaphragm (16) that coincide with the adhesive strips (17), the top side (20) of the spacing strips (19) is adhesive-repelling.

2. The overpressure valve as defined by claim 1, in which the spacing strips (19) have an adhesive-repelling layer on their top side (20).

3. The overpressure valve as defined by claim 1, in which the spacing strips (19) are coated on their top side (20) with Teflon or silicon.

4. The overpressure valve as defined by claim 1, in which an adhesive-free valve strip (14) is disposed above said hole (13) and secured onto an adhesive layer on the bottom surface of the diaphragm (16), between the two adhesive strips (17).

5. The overpressure valve as defined by claim 2, in which an adhesive-free valve strip (14) is disposed above said hole (13) and secured onto an adhesive layer on the bottom surface of the diaphragm (16), between the two adhesive strips (17).

6. The overpressure valve as defined by claim 3, in which an adhesive-free valve strip (14) is disposed above said hole (13) and secured onto an adhesive layer on the bottom surface of the diaphragm (16), between the two adhesive strips (17).

7. The overpressure valve as defined by claim 1, in which the contour of the overpressure valve (10) is essentially rectangular.

8. The overpressure valve as defined by claim 1, in which the contour of the overpressure valve (10a) is hexagonal.

9. The overpressure valve as defined by claim 4, in which the base (12) is made of a material with the same temperature of expansion coefficient as the valve strip (14) and the diaphragm (16), particularly of polyester having a thickness of 150 $\mu$m to 250 $\mu$m.

10. The overpressure valve as defined by claim 5, in which the base (12) is made of a material with the same temperature of expansion coefficient as the valve strip (14) and the diaphragm (16), particularly of polyester having a thickness of 150 $\mu$m to 250 $\mu$m.

11. The overpressure valve as defined by claim 6, in which the base (12) is made of a material with the same temperature of expansion coefficient as the valve strip (14) and the diaphragm (16), particularly of polyester having a thickness of 150 $\mu$m to 250 $\mu$m.

12. The overpressure valve as defined by claim 4, in which the valve strip (14) is made of a material with the same temperature of expansion coefficient as the base (12) and the diaphragm (16), particularly of polyester of a thickness of 5 $\mu$m to 35 $\mu$m.

13. The overpressure valve as defined by claim 5, in which the valve strip (14) is made of a material with the same temperature of expansion coefficient as the base (12) and the diaphragm (16), particularly of polyester of a thickness of 5 $\mu$m to 35 $\mu$m.

14. The overpressure valve as defined by claim 6, in which the valve strip (14) is made of a material with the same temperature of expansion coefficient as the base (12) and the diaphragm (16), particularly of polyester of a thickness of 5 $\mu$m to 35 $\mu$m.

15. The overpressure valve as defined by claim 4, in which the diaphragm (16) is made of a material with the same temperature of expansion coefficient as the base (12) and the valve strip (14), particularly of polyester of a thickness of 5 $\mu$m to 35 $\mu$m.

16. The overpressure valve as defined by claim 5, in which the diaphragm (16) is made of a material with the same temperature of expansion coefficient as the base (12) and the valve strip (14), particularly of polyester of a thickness of 5 $\mu$m to 35 $\mu$m.

17. The overpressure valve as defined by claim 6, in which the diaphragm (16) is made of a material with the same temperature of expansion coefficient as the base (12) and the valve strip (14), particularly of polyester of a thickness of 5 $\mu$m to 35 $\mu$m.

18. The overpressure valve as defined by claim 1, in which the spacing strips (19) are made of polyester, polyethylene, Teflon, silicon board or polypropylene, and have a thickness of 150 $\mu$m to 500 $\mu$m in particular.

19. The overpressure valve as defined by claim 2, in which the spacing strips (19) are made of polyester, polyethylene, Teflon, silicon board or polypropylene and having a thickness of 150 $\mu$m to 500 $\mu$m in particular.

20. The overpressure valve as defined by claim 3, in which the spacing strips (19) are made of polyester, polyethylene, Teflon, silicon board or polypropylene and having a thickness of 150 $\mu$m to 500 $\mu$m in particular.

* * * * *